L. A. Seward,
Concertina.
No. 96,150.    Patented Oct. 26, 1869.
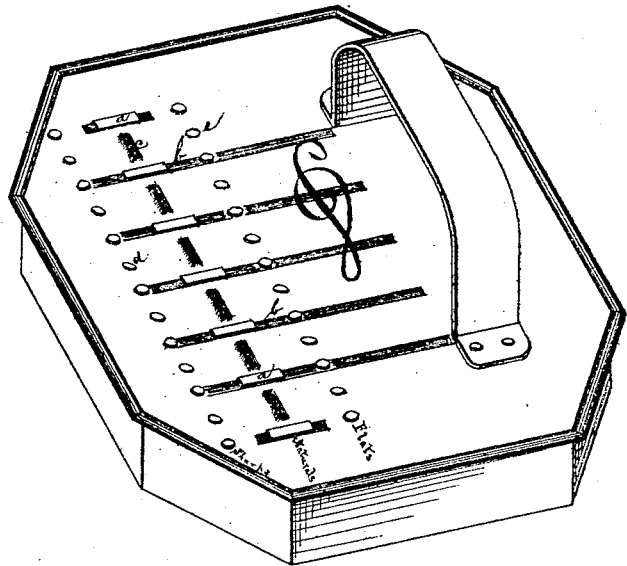
Witnesses —
H. N. Jenkins
C. W. Wailey
Inventor —
Louis A. Seward
by Rufus R. Rhodes
att.

United States Patent Office.

LOUIS A. SEWARD, OF NEW ORLEANS, LOUISIANA.

Letters Patent No. 96,150, dated October 26, 1869.

KEY-FACE FOR CONCERTINA.

The Schedule referred to in these Letters Patent and making part of the same.

I, LOUIS A. SEWARD, of the county of Somerset, England, but now residing in the city of New Orleans, State of Louisiana, have invented certain Improvements in the musical instrument known by the name of Concertina, of which the following is a specification.

My invention relates to the external faces of the key-boards of concertinas; and It consists of a representation on the outward faces of said boards of a musical staff of five lines and four spaces, with additional ledges, lines, and spaces, the right-hand side of the instrument to be used for treble, and the left-hand side for bass passages.

The drawing represents one side only of the instrument, the other side, as well as the intermediate parts being omitted.

The natural notes are represented on the drawing, and sounded in practice by the valves $a$, on the lines $b$, both occupying a horizontal relation when the instrument is held in proper position for use, whilst the space-valves $e$, between them, are perpendicular or at right angles to the same, so that the person who is using the instrument will know from the sense of touch alone, and without looking at the key-faces, when he touches a line or space-valve.

The round knobs $d$, I propose to paint red, while those marked $e$ are made green.

These knobs are the sharps and flats belonging to the natural notes, and from their form, the touch again readily indicates the difference between the natural and the accidental notes.

Thus it will be seen that the valves are so formed and placed, for they all project a little above the surface of the sides of the instrument in which they are placed, that the person performing on the instrument, by simply placing his fingers on the line or space indicated by the notes on the printed sheet of music before him, can, with the greatest possible ease and accuracy, produce the sound belonging to line or space, without previous instruction or the slightest knowledge of music. Hence, it follows, that my improvement enables every person who may desire to do it, to enjoy the pleasure of music without the long and tedious training now absolutely necessary to the attainment of even a moderate capability of execution on the concertina.

Nor is my invention applicable alone to the concertina. It may, by proper modifications, be applied to the piano, melodeon, and other keyed instruments.

I claim as my invention—

The making of the outward faces of the key-boards of concertinas in the way herein described and shown on the drawing.

L. A. SEWARD.

Witnesses:
   H. N. JENKINS,
   C. W. WAILEY